April 3, 1934.  J. M. YOUNG  1,953,093
METHOD OF PROVIDING HERMETICALLY SEALED FRICTION TOP CANS
Filed April 19, 1929
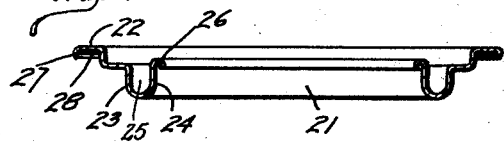
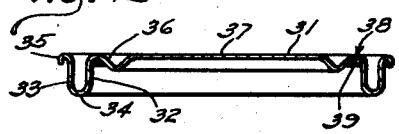
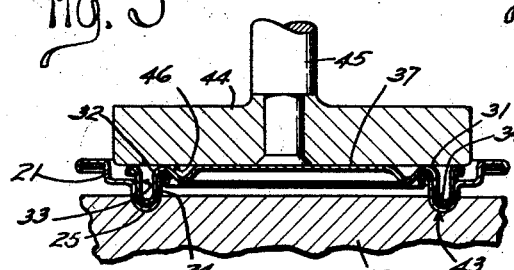
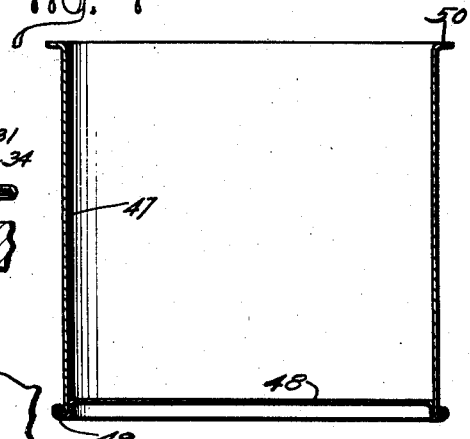
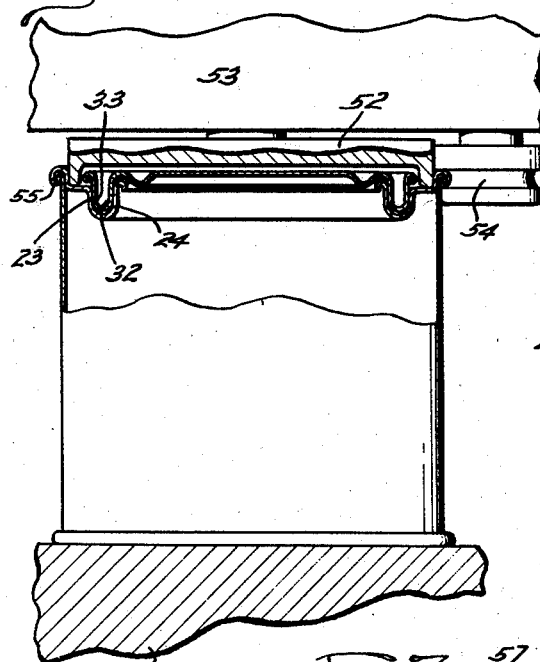
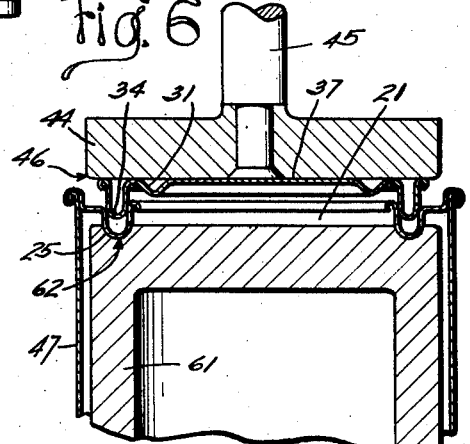
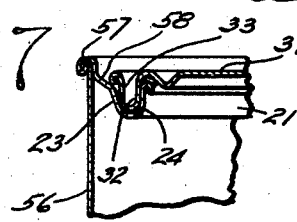
INVENTOR
John M. Young
BY John C. Carpenter
ATTORNEY Patented Apr. 3, 1934

1,953,093

UNITED STATES PATENT OFFICE 1,953,093

METHOD OF PROVIDING HERMETICALLY SEALED FRICTION TOP CANS

John M. Young, Brooklyn, N. Y., assignor to American Can Company, New York, N. Y., a corporation of New Jersey Application April 19, 1929, Serial No. 356,387

7 Claims. (Cl. 113—121)

The present invention relates to the assembling and sealing of friction top cans, i. e., cans which have a removable friction plug fitting into a friction ring, the plug and ring together forming one of the end closures of the can. The invention has for its objects the provision of an improved method of assembling and one which will insure the formation of an hermetic seal between the ring and plug.

The present invention contemplates a method of procedure wherein assembling of the cover parts is made in a manner that will insure the proper co-operation of the frictional surfaces of the cover parts and which will prevent any distortion or change of the accurately fitting portions of the cover parts during such assembling.

The principal object of the present invention is the creation of an hermetically sealed friction top can by assembling the parts relating thereto prior to the filling of the can with its contents, such assembling action being made while maintaining an accurate alinement of all co-operating portions of the cover parts.

A further important object of the invention is the provision of a method wherein parts of a friction top cover are supported and moved together in accurate register, one with the other, whereby the co-operating frictional surfaces of the cover parts are maintained true and without distortion as they are forced together.

Still another important object of the invention is the provision of a method of bringing co-operating parts of a friction closure into proper relation, one with the other, and with a sealing material therebetween, thus insuring an hermetically sealed joint.

Numerous other objects of the invention will be apparent as it is better understood from the following description, which, when taken in connection with the accompanying drawing, discloses a preferred embodiment thereof.

Referring to the drawing,

Figure 1 is a cross section of a friction ring;

Fig. 2 is a cross section of a friction plug;

Fig. 3 is a longitudinal sectional view of a portion of a mechanism for assembling the two friction cover parts, prior to attachment to a can body;

Fig. 4 is a longitudinal section of a flanged can;

Fig. 5 is a fragmentary sectional view, parts being shown in elevation of portions on a double seaming mechanism for uniting the assembled cover parts with a can body;

Fig. 6 is a view similar to Fig. 3 showing the assembling of the two friction cover parts after one part has been secured to a can body; and Fig. 7 is a fragmentary sectional view of a can body and attached friction closure illustrating distortion resulting from standard friction cover part insertion methods.

One of the friction cover parts of a can, shown on the drawing for the purpose of explaining the preferred practice of the present invention, constitutes a friction ring 21 provided with a flange 22 and having friction closure elements which may take the form of substantially parallel friction walls 23 and 24 formed as part of a U-section 25.

The friction wall 24 terminates in a curl or curled flange 26 which is utilized in the present instance as one of the sealing portions of the cover parts. Where the friction ring 21 is subsequently secured to a can body in the usual and preferred double seamed joint, flange 22 is curled at the outer edge 27 and this flange is lined with a suitable sealing material 28 which may be lining compound or fibre or other type of gasket.

The second friction cover part constitutes a friction plug 31 formed with accurately fitting friction closure elements which may take the the form of substantially parallel friction walls 32 and 33 formed as part of a U-section 34. Friction wall 33 preferably terminates in an annular curl 35 and friction wall 32 extends into an S-section 36, in turn extending into a central panel 37. One of the curved legs of the S-section 36 provides a groove 38 into which a sealing material 39 is preferably positioned.

The invention contemplates the forcing of the U-section of the plug and the U-section of the ring into telescoped relation by pressure directly applied and/or directly resisted at these U-sections from opposite sides, the while insuring against any distortion of the affected parts of the ring and plug.

The invention further contemplates that this assembly may be accomplished either before the ring is secured to the can or can body or after the ring has been so secured.

Where the friction cover parts are assembled with each other prior to attachment to a can or to a can body, the friction plug 31 is inserted into the friction ring 21 by a mechanism which may comprise pressure-closing members suitably mounted and operated. One type of such mechanism is illustrated in Fig. 3 and comprises a support 42 provided with an annular groove 43 and a pressure plate 44 carried on a stem 45, the pressure plate being in alinement with the support 42. Friction plug 31 and ring 21 are placed by hand (or in other manner) upon support 42, the former in axial alinement with and directly above the ring 21 which, in turn, is brought into axial alinement with support 42 by insertion of its U-section 25 within the groove 43. In this position the plug 31 rests lightly upon ring 21 and its U-section 34 is directly above and in axial alinement with the groove 43.

The assembling operation is the result of relative movement between support 42 and plate 44, a lower face 46 of the latter engaging the plug at the tops of the friction walls 32 and 33 and preferably also panel 37 of plug 31, said face 46 during such movement being parallel to the bottom of groove 43. The parallelism is maintained at all times and throughout the assembling of the friction plug within the friction ring the walls 32 and 33 and the co-operating walls 23 and 24 are held in exact alinement. In the finally assembled position curled flange 26 of ring 21 is embedded within the sealing material 39 of plug 31.

This supporting of ring 21 and the manner of positioning the parts, one with the other (i. e. without tilting or misalinement) completely dispenses with the usual distortion of parts which does or may take place in a greater or lesser degree when the receiving part (the friction ring) is unsupported.

After the cover parts 21 and 31 have been assembled they may then be secured either to a can or to a can body by means of any preferred or usual type of seam.

The cover parts may be secured to a can comprising a can body 47 (Fig. 4) having a bottom end 48 united therewith by a double seam 49 and such a can would preferably have a flange 50 at its upper end. The cover parts may be united directly to the can body 47 before it has received a bottom.

A seaming mechanism (Fig. 5) for securing the assembled cover parts to a can, or to a can body, includes a support 51 on which the can or can body is placed with the assembled cover parts 21 and 31 loosely resting on its upper end. The friction ring 21 is engaged by a chuck 52 mounted in a seaming head 53 carrying seaming rollers 54, only one of which is illustrated. Rollers 54 and chuck 52 co-operate in the usual manner to interfold the lined annular flange 22 of the friction ring 21 with the flange 50 of the can body 47 to form a double seam 55. During this seaming of ring 21 to the can or can body, the positioned friction plug 31 is not engaged by the seaming mechanism and the co-operating frictional surfaces 23, 33, 24 and 32 of plug and ring are, therefore, undisturbed.

Where the friction ring 21 is first secured to a can body 47 the assembling mechanism (Fig. 6) can be similar to the mechanism previously described in connection with Fig. 3. In this instance, however, the can formed by body member 47 and ring 21 is positioned over a support 61. The U-section 25 is positioned within a groove 62 formed in support 61. Plug 31 is placed in axial alinement and directly above ring 21 which is held within groove 62. In this position plug 31 rests lightly upon ring 21 and its U-section 34 is directly above and in axial alinement with groove 62, this being the position illustrated in Fig. 6. Such positioned cover parts are thus directly beneath pressure plate 44, which, in this case, is parallel to the bottom of groove 62.

The assembling of plug 31 and ring 21 is accomplished by relative movement between support 61 and plate 44 as already described. In this case, since the assembled cover parts are secured to a can body, they will constitute the bottom of the can until after it is filled.

Where the friction cover parts are assembled before attachment to a can they will constitute the top or cover thereof and will be secured thereto only after the can has been filled with its contents. After the can has been completely filled and closed, the friction closure end will constitute its top regardless of which method has been employed in its creation, this being the end which is opened by the ultimate consumer and from which the contents of the can are discharged.

Fig. 7 illustrates a typical instance of distortion caused by the insertion of a tightly fitting plug 31 within an unsupported friction ring 21 which had been previously secured to a can 56 by a typical double seam 57. When this distortion of ring 21 takes place, there is formed an inclined surface 58 and during this action the upper part of wall 23 is drawn away from wall 33 and the accurate fitting between the different frictional surfaces of walls 23, 33, 32 and 24 is thereby destroyed. Such an occurrence is prevented in the present invention by the supporting of the parts of plug 31 and ring 21 adjacent the frictional surfaces of these parts, as has been previously described.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. The method of making hermetically sealed friction top cans, which comprises positioning a first and a second cover part in axial alignment with each other and upon a support engaging the middle portion of one of said cover parts and forcing the cover parts together with their frictional surfaces in engagement until a portion of one cover part is embedded in a sealing compound carried by the other part.

2. The method of making hermetically sealed friction top cans, which comprises positioning a first and a second cover part in axial alignment with each other and upon a support and by the latter engaging the under side of the cover part which is next to said support, forcing the cover parts together, while one of said parts is supported as described, with their frictional surfaces in engagement until a portion of one cover part is embedded in a sealing compound carried by the other part, and uniting the assembled cover parts with a can body.

3. The method of making hermetically sealed friction top cans, which comprises positioning a first and a second cover part in axial alignment with each other and between parallel faces of relatively movable members, moving said faces toward each other while maintaining parallelism of said cover parts, thereby assembling said cover parts in frictional contact one with the other.

4. The method of making hermetically sealed friction top cans, which comprises positioning a first and a second cover part in axial alignment with each other and with the frictional surface of one part engaging the cooperating frictional surface of the other part, and forcing the cover parts into assembled position while maintaining axial alignment by supporting each part adjacent its frictional surface.

5. The method of making hermetically sealed friction top cans, which comprises positioning a first and a second cover part in axial alignment with each other and with the frictional surface of one part engaging the cooperating frictional surface of the other part, forcing the cover parts into assembled position while maintaining axial alignment by supporting each part adjacent its frictional surface and uniting the assembled cover parts with a can body.

6. The method of making hermetically sealed friction top cans, which comprises positioning a first cover part having a groove, and a second cover part having a portion adapted to fit tightly in said groove in axial alignment with each other and upon a support having a groove in which the groove of said first cover part fits and forcing the cover parts together with their frictional surfaces in engagement by moving said second cover part toward said groove while maintaining parallelism of said frictional surfaces and until a portion of one cover part is embedded in a sealing compound carried by the other part.

7. The method of assembling an hermetic sheet metal friction closure for containers, said closure comprising a ring and plug formed with depending and interfitting U-shaped friction elements, which consists in lining one of said elements with gasket material, and applying pressure to the top of said plug, while supporting against pressure the bottom part of the said U-shaped friction element of the ring to interlock said elements securely and to compress said gasket material.

JOHN M. YOUNG.